(12) United States Patent
Adachi

(10) Patent No.: US 11,640,087 B2
(45) Date of Patent: May 2, 2023

(54) DISPLAY DEVICE

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/830,505

(22) Filed: Jun. 2, 2022

(65) Prior Publication Data

US 2022/0390800 A1    Dec. 8, 2022

(30) Foreign Application Priority Data

Jun. 2, 2021 (JP) .............................. JP2021-092929

(51) Int. Cl.
*G02F 1/1343* (2006.01)
*G02F 1/1339* (2006.01)
*G02F 1/1333* (2006.01)
*G02F 1/1362* (2006.01)

(52) U.S. Cl.
CPC ...... *G02F 1/134309* (2013.01); *G02F 1/1339* (2013.01); *G02F 1/133357* (2021.01); *G02F 1/133388* (2021.01); *G02F 1/136218* (2021.01); *G02F 1/136286* (2013.01); *G02F 1/13439* (2013.01); *G02F 2201/56* (2013.01)

(58) Field of Classification Search
CPC ......... G02F 1/134309; G02F 1/133388; G02F 1/1339; G02F 1/136218; G02F 1/13439; G02F 2201/56
See application file for complete search history.

(56) References Cited

U.S. PATENT DOCUMENTS

2001/0046011 A1  11/2001  Yasukawa
2016/0253973 A1*  9/2016  Nishida ................ G09G 3/3655
                                                                345/209

FOREIGN PATENT DOCUMENTS

JP         2014-013406 A      1/2014

* cited by examiner

*Primary Examiner* — James A Dudek
(74) *Attorney, Agent, or Firm* — K&L Gates LLP

(57) ABSTRACT

According to one embodiment, a display device includes a first substrate, a second substrate opposing the first substrate, a liquid crystal layer disposed between the first substrate and the second substrate and a sealant which seals the liquid crystal layer. The first substrate includes a pixel electrode disposed in a display area, a peripheral circuit disposed in a peripheral area surrounding the display area and a shield electrode disposed in a position overlapping the peripheral circuit in plan view. The second substrate includes a common electrode disposed in the display area and opposing the pixel electrode. The shield electrode and the common electrode do not overlap each other in plan view.

22 Claims, 9 Drawing Sheets

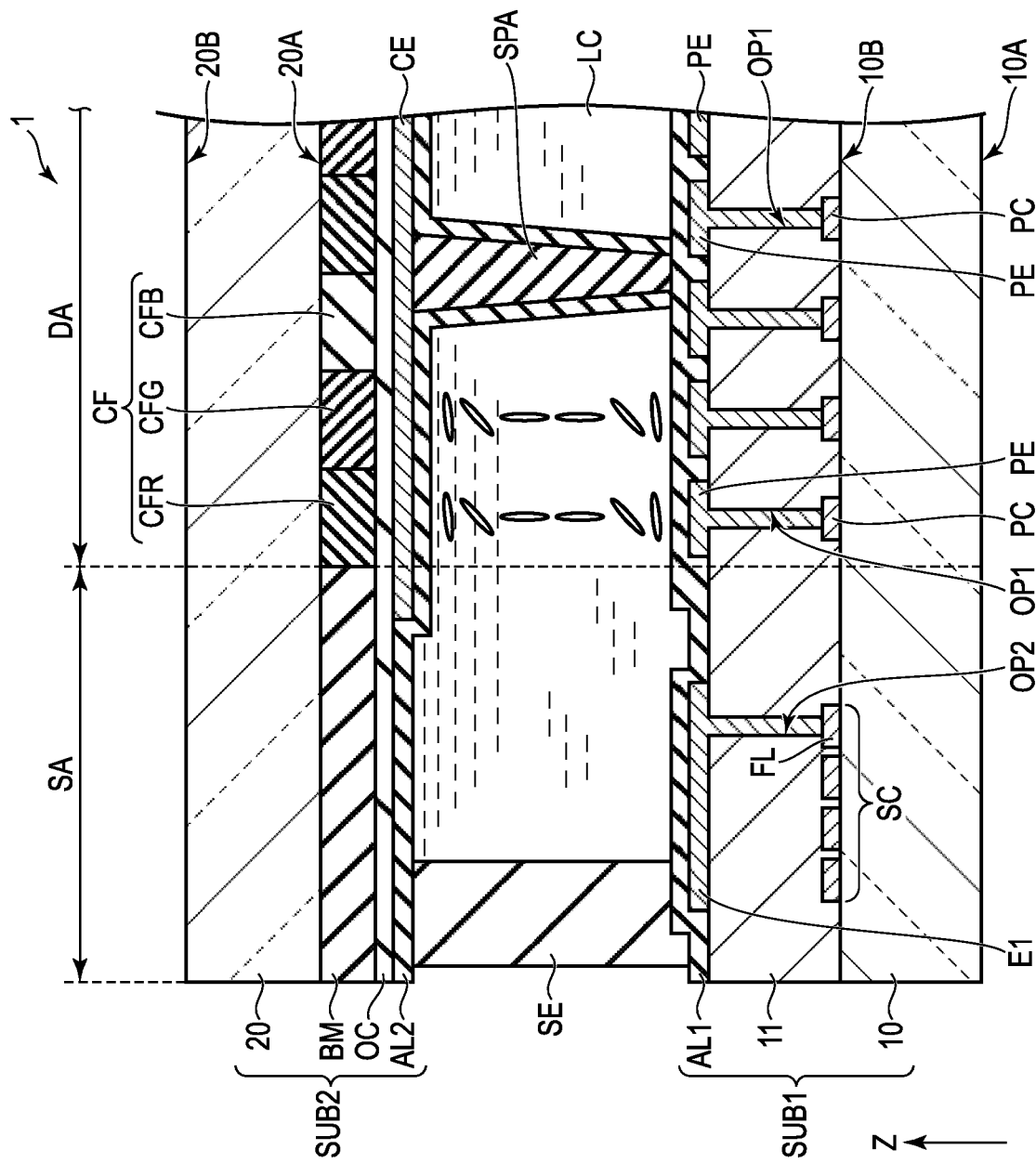
F I G. 2

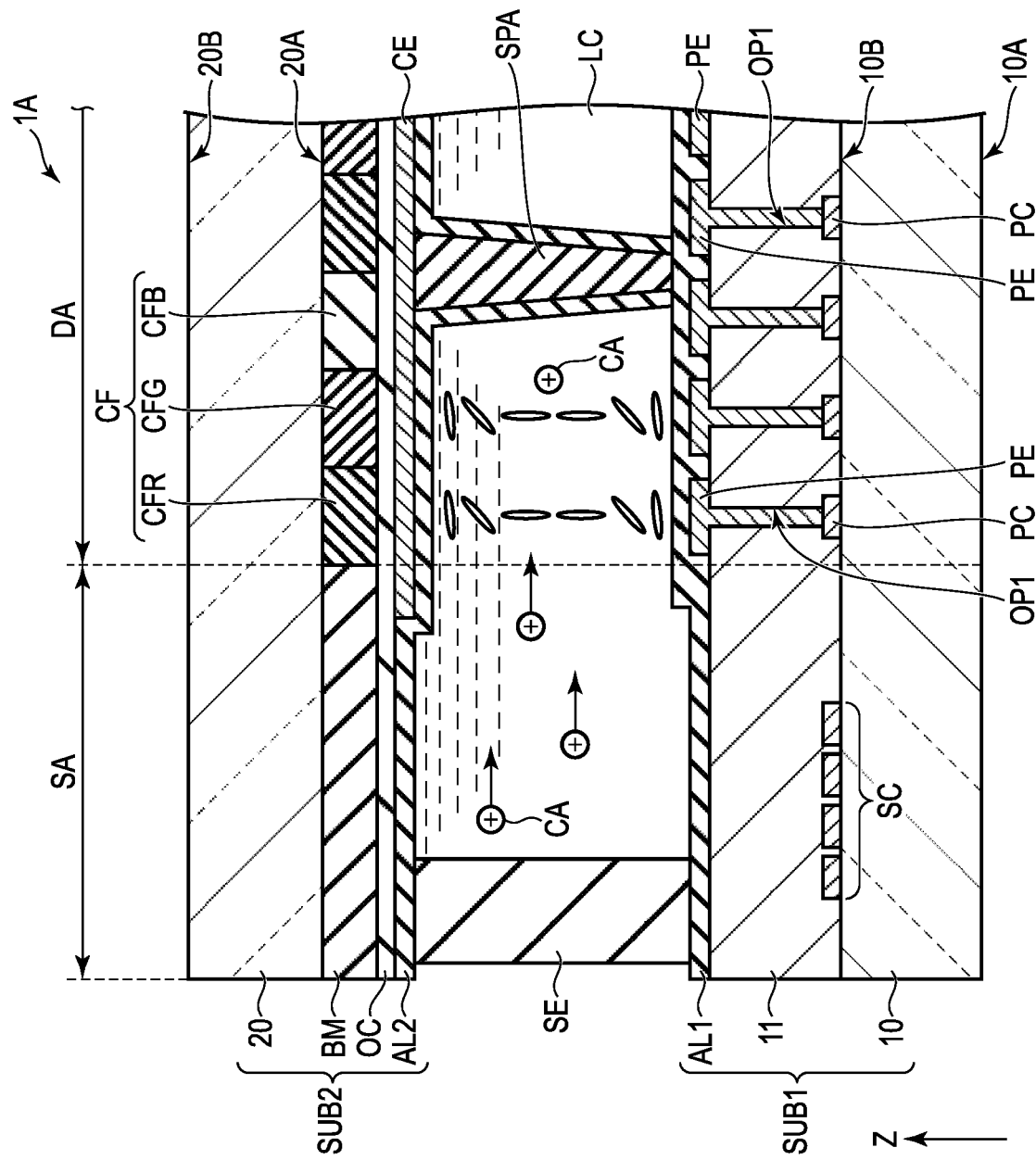
F I G. 4

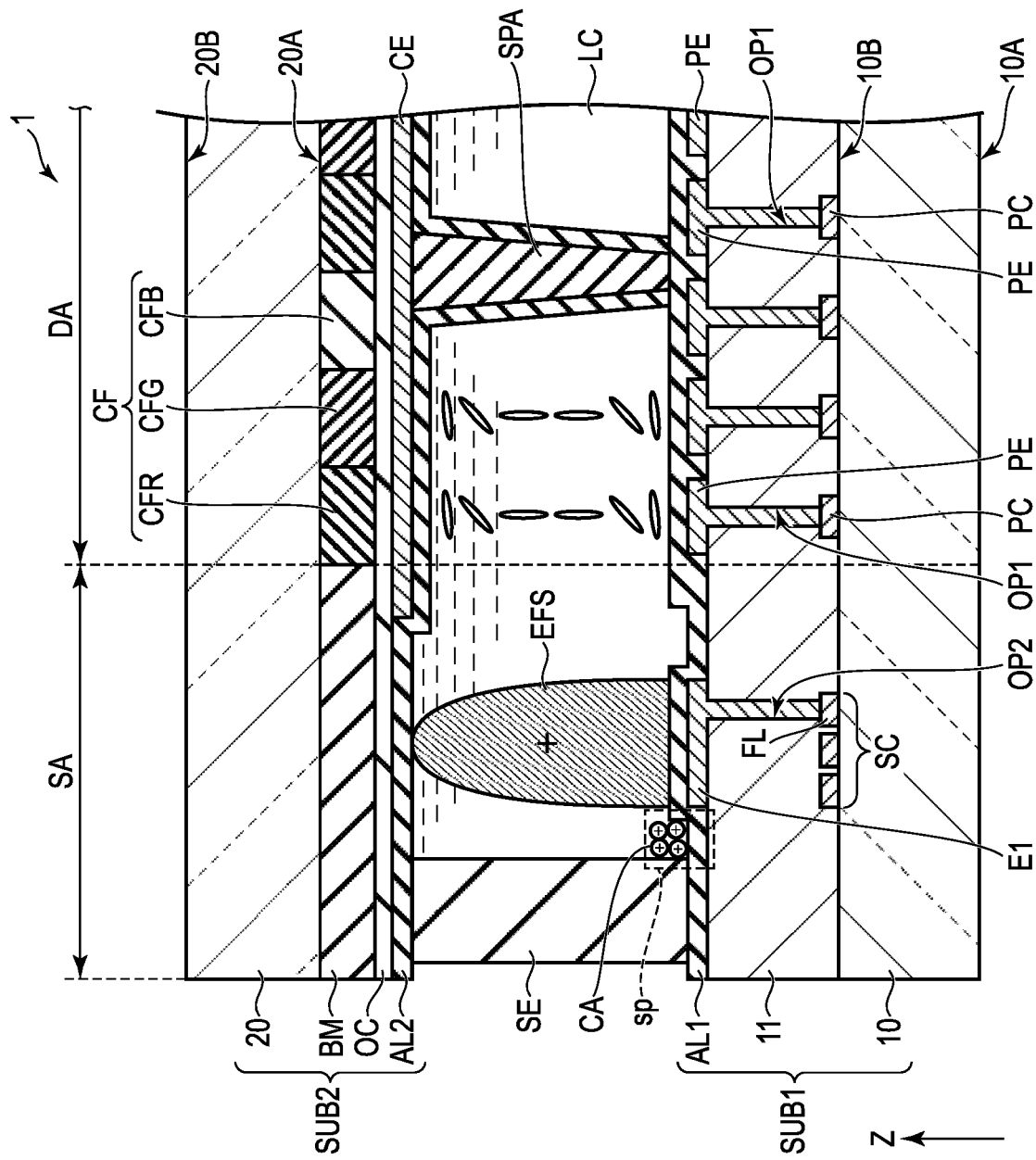
F I G. 6

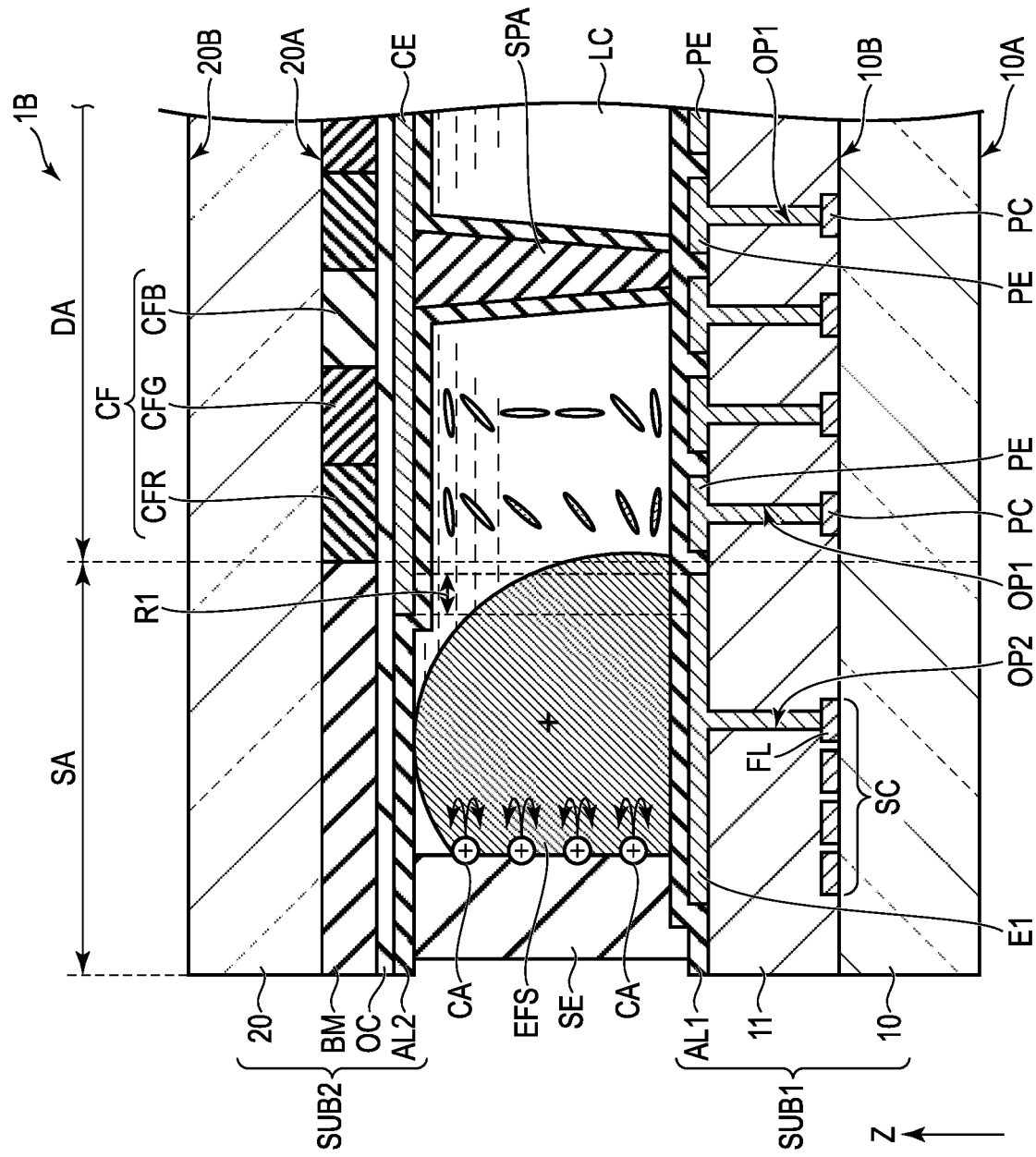
F I G. 7

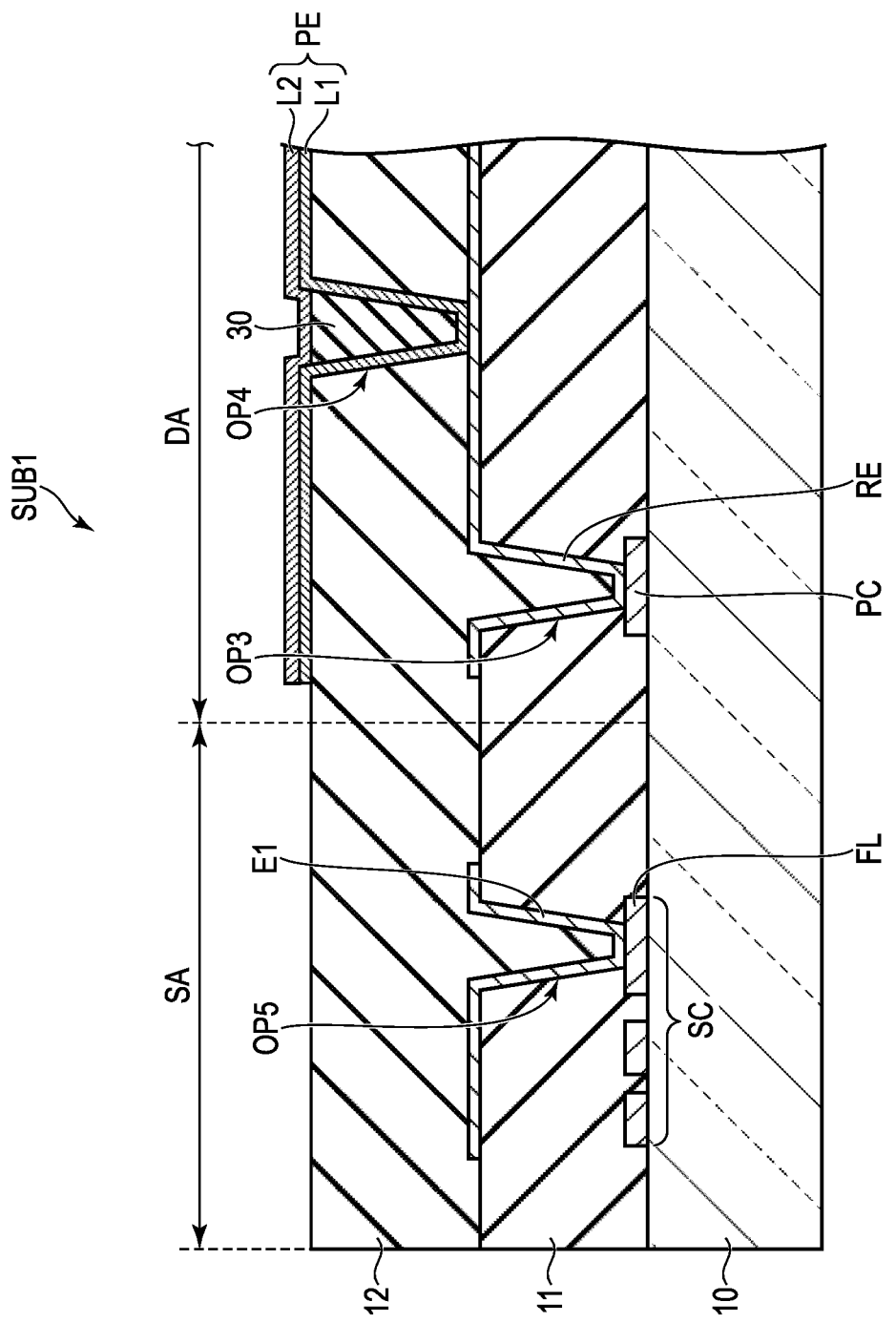
F I G. 9

DISPLAY DEVICE

CROSS-REFERENCE TO RELATED APPLICATIONS

This application is based upon and claims the benefit of priority from Japanese Patent Application No. 2021-092929, filed Jun. 2, 2021, the entire contents of which are incorporated herein by reference.

FIELD

Embodiments described herein relate generally to a display device.

BACKGROUND

In recent years, wearable devices (for example, wristwatch-type wearable devices, eyeglass-type wearable devices and the like) have become increasingly popular. In such wearable devices, there is a demand of maintaining good image display, and therefore various developments are underway.

BRIEF DESCRIPTION OF THE DRAWINGS

FIG. 2 shows a cross-sectional view showing a configuration example of the display device of the embodiment.

FIG. 4 is a cross-sectional view showing a display device according to the first comparative example.

FIG. 6 is a cross-sectional view showing another configuration example of the display device of the embodiment.

FIG. 7 is a cross-sectional view showing a display device according to the second comparative example.

FIG. 9 is a cross-sectional view showing another configuration example of the first substrate which constitutes the display device of the embodiment.

DETAILED DESCRIPTION

Figure 1:
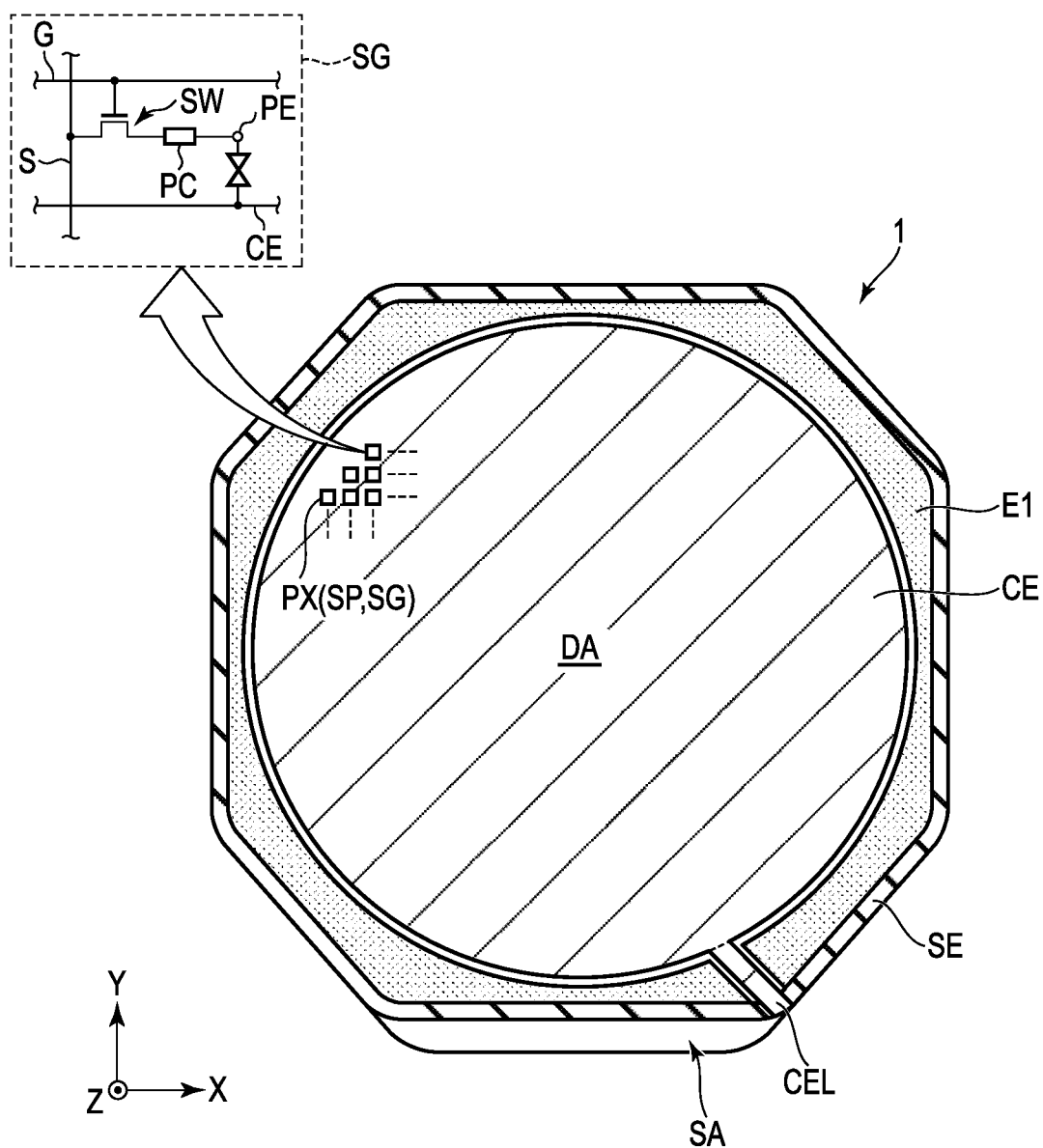
FIG. 1 is a plan view showing a configuration example of a display device according to one embodiment.

In general, according to one embodiment, a display device comprises a first substrate, a second substrate opposing the first substrate, a liquid crystal layer disposed between the first substrate and the second substrate and a sealant which adheres the first substrate and the second substrate to each other and seals the liquid crystal layer. The first substrate includes a pixel electrode disposed in a display area, a peripheral circuit disposed in a peripheral area surrounding the display area and a shield electrode disposed in a position overlapping the peripheral circuit in plan view. The second substrate includes a common electrode disposed in the display area and opposing the pixel electrode. The shield electrode and the common electrode do not overlap each other in plan view.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view showing a configuration example of a display device 1 according to an embodiment. For example, a first direction X, a second direction Y and a third direction Z are orthogonal to each other, but they may intersect at an angle other than 90 degrees. The first direction X and the second direction Y correspond to the directions parallel to a main surface of a substrate that constitutes the display device 1. The third direction Z is equivalent to a thickness direction of the display device 1. In the following descriptions, a direction toward the tip of the arrow indicating the third direction Z may be referred to as upward, and a direction from the tip of the arrow to the opposite direction may be referred to as downward. In addition, it is assumed that there is an observation position to observe the display device DSP on a tip side of an arrow in a third direction Z, and viewing from this observation position toward the X-Y plane defined by the first direction X and the second direction Y is referred to as a planar view.

As shown in FIG. 1, the display device 1 comprises a display area DA in which images are displayed and a frame-like peripheral area surrounding the display area DA. Pixels PX are disposed on the display area DA. Specifically, in the display area DA, a number of pixels PX are arranged in a matrix along the first direction X and the second direction Y. In this embodiment, the pixels PX each include red (R), green (G) and blue (B) sub-pixels SP. Further, the sub-pixels SP each include a plurality of segment pixels SG. The segment pixels which constitute one sub-pixel comprise respective pixel electrodes PE having areas different from each other. With this structure, and by switching between display/non-display states of the segment pixels SG, a gradation can be formed for each sub-pixel SP.

As shown enlarged in FIG. 1, a segment pixel SG comprises a switching element SW, a pixel circuit PC, a pixel electrode PE, a common electrode CE, a liquid crystal layer LC and the like. The switching element SW is formed from, for example, a thin-film transistor (TFT) and is electrically connected to a scanning line G and a signal line S. The scanning line G is electrically connected to the switching element SW of each of the segment pixels SG aligned along the first direction X. The signal line S is electrically connected to the switching element SW of each of the segment pixels SG aligned along the second direction Y. To the pixel electrode PE, a predetermined potential is applied based on the output from the pixel circuit PC. Each of the pixel electrodes PE opposes the common electrode CE disposed over the entire surface of the display area DA, and the liquid crystal layer LC is driven by an electric field (vertical electric field) generated between the respective pixel electrode PE and the common electrode CE. The scanning line G and the signal line S are electrically connected to a peripheral circuit located in the peripheral area SA.

Note that in this embodiment, it is assumed that each sub-pixel SP includes a plurality of segment pixels SG, but the configuration is not limited to this. For example, each segment pixel SG may contain a single segment pixel SG. In this case, the sub-pixel SP corresponds to the segment pixel SG shown enlarged in FIG. 1, and the switching element SW, the pixel circuit PC and the pixel electrode PE are formed for each sub-pixel SP.

In the peripheral area SA, there are peripheral circuits disposed, including various types of drivers connected to the scanning lines G and the signal lines S, wiring lines which provide a predetermined potential to the pixel electrodes PE and the common electrode CE and the like. The peripheral circuits will be described later and therefore the illustration thereof is omitted in FIG. 1. In the peripheral area SA, a shield electrode E1 is disposed. The shield electrode E1 is placed over substantially the entire surface of the area where the peripheral circuits are disposed in the peripheral area SA. Note here that the shield electrode E1 and the common electrode CE do not overlap each other in plan view. The shield electrode E1 does not overlap in plan view a lead-out line CEL, which is drawn from the display area DA to the peripheral area SA. The lead-out line CEL is a part of the common electrode CE, which is electrically connected to the wiring line which applies a predetermined potential to the common electrode CE in the peripheral area SA. In the peripheral area SA, a sealant SE is disposed to seal the liquid crystal layer LC.

FIG. 2 is a cross-sectional view showing a configuration example of the display device 1 of this embodiment. In the following descriptions, the configuration on the display area DA side and the configuration on the peripheral area SA side will be described respectively.

The display device 1 comprises a first substrate SUB1, a second substrate SUB2, a sealant SE, a liquid crystal layer LC and a spacer SPA. The first substrate SUB1 and the second substrate SUB 2 are each formed into a flat plate including a plane parallel to the X-Y plane. The first substrate SUB1 and the second substrate SUB 2 are superimposed in planar view and are adhered together by the sealant SE. The liquid crystal layer LC is placed between the first substrate SUB1 and the second substrate SUB2 and sealed by the sealant SE. The sealant SE may contain a conductive material (conductive beads coated with metal), not shown here, and with this configuration, the structure of the first substrate SUB1 side and the structure of the second substrate SUB2 side are electrically connected to each other. The spacer SPA is disposed between the first substrate SUB1 and the second substrate SUB2, and between the first substrate SUB1 and the second substrate SUB2, a predetermined cell gap is created.

Note that though the illustration thereof is omitted in FIG. 2, a polarizer and a cover member are further provided on the second substrate SUB2.

On the display area DA side, the first substrate SUB1 comprises, as shown in FIG. 2, a transparent substrate 10, pixel circuits PC, a planarization film 11, pixel electrodes PE and an alignment film AL1. The first substrate SUB1 further comprises the scanning lines G and the signal lines S, the switching elements SW and the like shown in FIG. 1, in addition to the above-described configuration, but these are omitted from the illustration in FIG. 2.

The transparent substrate 10 comprises a main surface (lower surface) 10A and a main surface (upper surface) 10B on an opposite side to the main surface 10A. The pixel circuits PC are disposed on the transparent substrate 10. The planarization film 11 is constituted by at least one or more insulating films and covers the pixel circuits PC. The pixel electrodes PE are disposed on the planarization film 11 and are connected to the pixel circuits PC through openings OP1, respectively, formed in the planarization film 11. The alignment film AL1 covers the pixel electrodes PE and is in contact with the liquid crystal layer LC.

Note that FIG. 2 shows the pixel circuits PC in a simplified manner, but in reality, the pixel circuits PC each include a semiconductor layer and electrodes of various layers.

On the display area DA side, the second substrate SUB2, as shown in FIG. 2, comprises a transparent substrate 20, color filters CF, an overcoat layer OC, a common electrode CE and an alignment film AL2.

The transparent substrate 20 comprises a main surface (lower surface) 20A and a main surface (upper surface) 20B on an opposite side to the main surface 20A. The color filters CF are disposed on a main surface 20A side of the transparent substrate 20 and oppose the pixel electrodes PE. The color filters CF include a red color filter CFR, a green color filter CFG, a blue color filter CFB and the like. The overcoat layer OC covers the color filters CF. The common electrode CE is disposed over a plurality of segment pixels SG (a plurality of pixels PX) and opposes a plurality of pixel electrodes PE along the third direction. The common electrode CE is disposed on the overcoat layer OC. The alignment film AL2 covers the common electrode CE and is in contact with the liquid crystal layer LC. FIG. 2 illustrates an example case where a light-shielding film is not provided to compartmentalize into color filters CF as a configuration of the second substrate SUB2 on the display area DA side, but such a configuration may as well do that a light-shielding film is provided to compartmentalize into each color filter CF, and the light-shielding film partially overlaps the color filters CF.

The transparent substrates 10 and 20 are, for example, insulating substrates such as glass substrates or plastic substrates. The planarization film 11 is formed of, for example, a transparent organic insulating film such as of acrylic resin. For example, the planarization film 11 may be formed of multiple layers including an inorganic insulating film such as of silicon oxide, silicon nitride, silicon oxynitride or the like and an organic insulating film. The pixel electrode PE is formed as a reflective electrode and has a configuration that, for example, a transparent conductive film of indium tin oxide (ITO), indium zinc oxide (IZO) or the like and a reflective electrode of silver (Ag) are stacked on another. The common electrode CE is a transparent electrode formed of a transparent conductive material such as ITO or indium zinc oxide (IZO). The alignment films AL1 and AL2 are films that impart alignment restriction force to the liquid crystal material of the liquid crystal layer LC. The alignment restriction force may be applied by a rubbing treatment or a photo-alignment treatment.

On the peripheral area SA side, the first substrate SUB1 comprises, as shown in FIG. 2, a transparent substrate 10, peripheral circuits SC, a planarization film 11, a shield electrode E1 and an alignment film AL1. In the following descriptions, detailed descriptions will be omitted for the configuration already described on the display area DA side.

On the transparent substrate 10, the peripheral circuits SC are disposed. As described above, the peripheral circuits SC each include various types of drivers and wiring lines, that is, for example, a wiring line for applying a predetermined potential to the common electrode CE, a wiring line to apply a predetermined potential to the shield electrode E1 and the like. In the following descriptions, the wiring line for applying a predetermined potential to the shield electrode E1 will be referred to as a feeding line FL. The planarization film 11 covers the peripheral circuits SC. The shield electrode E1 is placed on the planarization film 11. The shield electrode E1 is in contact with the feeding line FL via an opening OP2 formed in the planarization film 11. The alignment film AL1 covers the shield electrode E1 and is in contact with the liquid crystal layer LC. The feeding line FL can be configured to supply electric potential only to the shield electrode E1, but the configuration is not limited to this. The feeding line FL may as well function as one of the feeding lines for the peripheral circuits SC. In this configuration, the feeding line FL is connected to the shield electrode E1 and to the peripheral circuit SC as well. When the feeding line FL functions as a feeding line for the peripheral circuit SC, the feeding line FL is circulated along the display area DA. In this case, the shield electrode E1 may be connected to the feeding line FL at multiple locations around the display area DA.

The shield electrode E1 is disposed to overlap the peripheral circuits SC in plan view (in other words, the shield electrode E1 is disposed to cover the peripheral circuits SC). More precisely, the shield electrode E1 overlaps substantially all of the peripheral circuits SC disposed in the peripheral area SA in plan view. In FIG. 2, the peripheral circuits SC are placed to a position where they overlap the sealant SE partially in plan view. Consequently, the shield electrode E1 as well extends to a position where it overlaps the sealant SE partially in plan view. To the shield electrode E1, a positive fixed potential (for example, +3 V) is applied via the feeding line FL. Although the details thereof will be described later, as a positive fixed potential is applied to the shield electrode E1, display errors, which may be caused by cations leaked from the sealant SE, can be suppressed.

On the peripheral area SA side, the second substrate SUB2 comprises, as shown in FIG. 2, a transparent substrate 20, a light-shielding film BM, an overcoat layer OC and an alignment film AL2. In the following, detailed descriptions will be omitted for the configuration already described for the display area DA side.

On the main surface 20A side of the transparent substrate 20, the light-shielding film BM is disposed. The light-shielding film BM is placed over substantially the entire surface of the peripheral area SA. The overcoat layer OC covers the color filters CF on the display area DA side and the light-shielding film BM. The alignment film AL2 covers the overcoat layer OC and is in contact with the liquid crystal layer LC.

Figure 3:
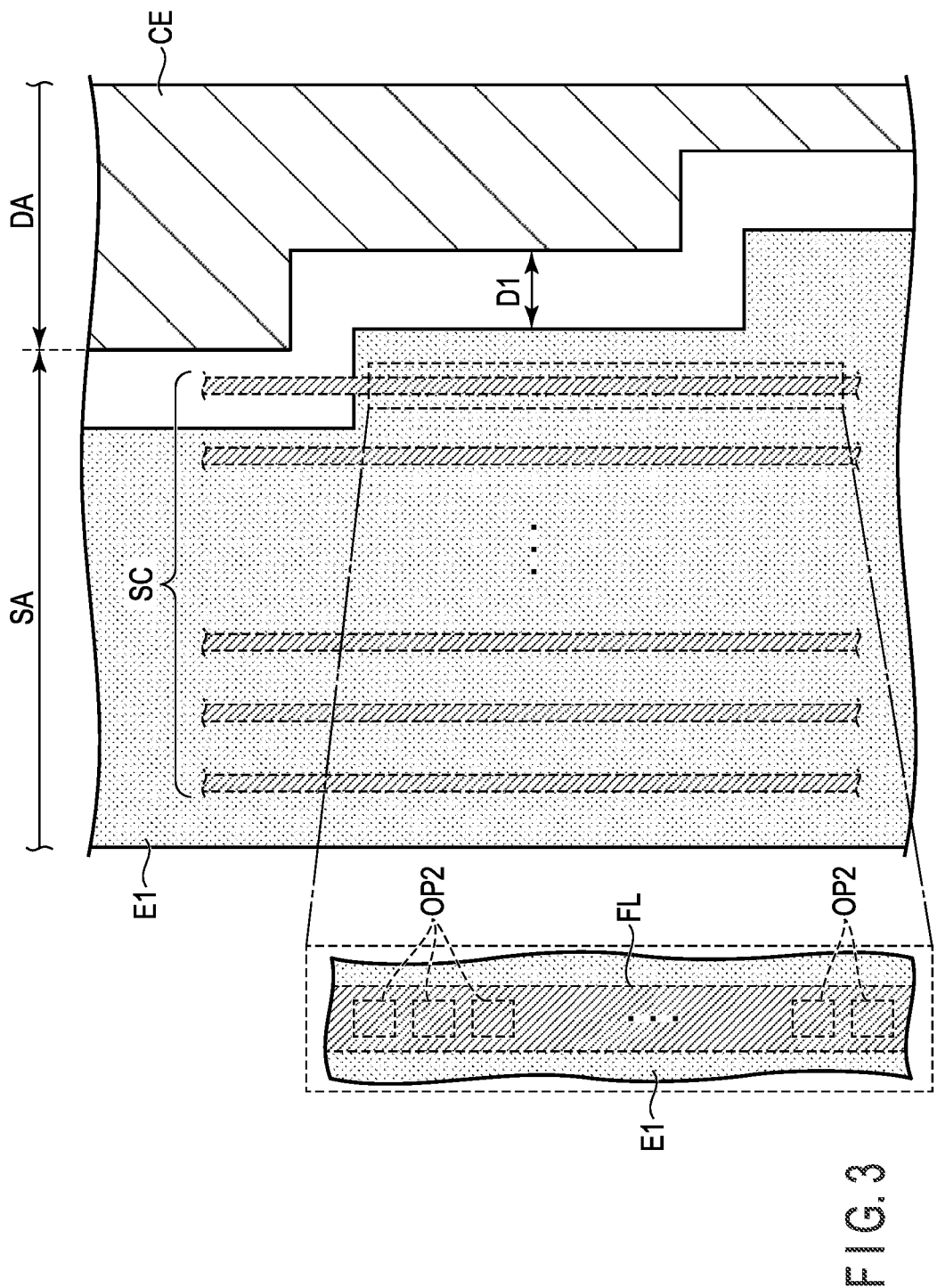
FIG. 3 is an enlarged plan view showing a part of a peripheral area of the embodiment.

FIG. 3 is an enlarged plan view of a part of the peripheral area SA. As shown in FIG. 3, the peripheral circuits SC are disposed in the peripheral area SA. In FIG. 3, only various types of wiring lines arranged in the peripheral area SA are illustrated as the peripheral circuits SC, but as already mentioned, the peripheral circuits SC each include various drivers and the like. The shield electrode E1 is disposed to overlap the peripheral circuits SC in plan view. The shield electrode E1 is connected to a feeding line FL, which is one of the peripheral circuits SC, via a plurality of openings OP2. The shield electrode E1 disposed in the peripheral area SA does not overlap the common electrode CE in plan view, and an interval of a distance D1 is set between the shield electrode E1 and the common electrode CE.

Between the feeding line FL and an end edge of the peripheral area SA, a wiring line different from the feeding line FL for the peripheral circuit SC may be provided. An inner edge of the shield electrode E1 is spaced apart by the distance D1 from an outer edge of the common electrode CE, and a part of the feeding line FL overlaps the shield electrode E1 in plan view, whereas another part thereof passes through between the common electrode CE and the shield electrode E1.

As shown in FIG. 1, the display area DA is schematically illustrated as arc-shaped, but in reality, the pixels PX which constitute the outer edge are arranged in a staircase-like (stepped) configuration. With these many pixels PX around the display area arranged in a staircase-like pattern, the display area is visually recognized by the user such as to exhibit a circular arc as a whole. The common electrode CE arranged along the outer edge of the display area DA is also formed in a stepped shape as the shape of the periphery of the display area as shown in FIG. 3. An inner edge of the shield electrode E1, which is placed at a distance D1 from the common electrode CE over substantially its entire circumference, is also formed into a stepped shape as shown in FIG. 3. Note that even between the lead-out line CEL, which is a part of the common electrode CE, and the shield electrode E1, the distance D1 is maintained. In other words, the distance D1 is maintained between the lead-out line CEL and the shield electrode E1.

Here, the effects which can be exhibited by the display device 1 of this embodiment will be described in comparison with the first comparative example. The first comparative example is intended to illustrate some of the effects which can be exhibited by the display device 1 of this embodiment, and the effects common to the first comparative example and this embodiment are not excluded from the scope of the present invention.

A display device 1A of the first comparative example is different from the display device 1 of the present embodiment illustrated in FIGS. 1 to 3 in the configuration that the shield electrode E1 is not provided as shown in FIG. 4.

It is known that cations CA are leaked as impurity ions from the sealant SE which seals the liquid crystal layer LC. Cations are positively charged atoms or atomic groups. The cations CA leaked from the sealant SE are affected by the electric field generated between the pixel electrodes PE and the common electrode CE while displaying images, for example, and thus the cations move in the liquid crystal layer LC from the peripheral area SA to the display area DA, as shown in FIG. 4, and stagnate in the display area DA. If the cation CA stagnates in the display area DA, local potential anomalies and the like may occur due to the cations CA, possibly resulting in partial display errors.

Figure 5:
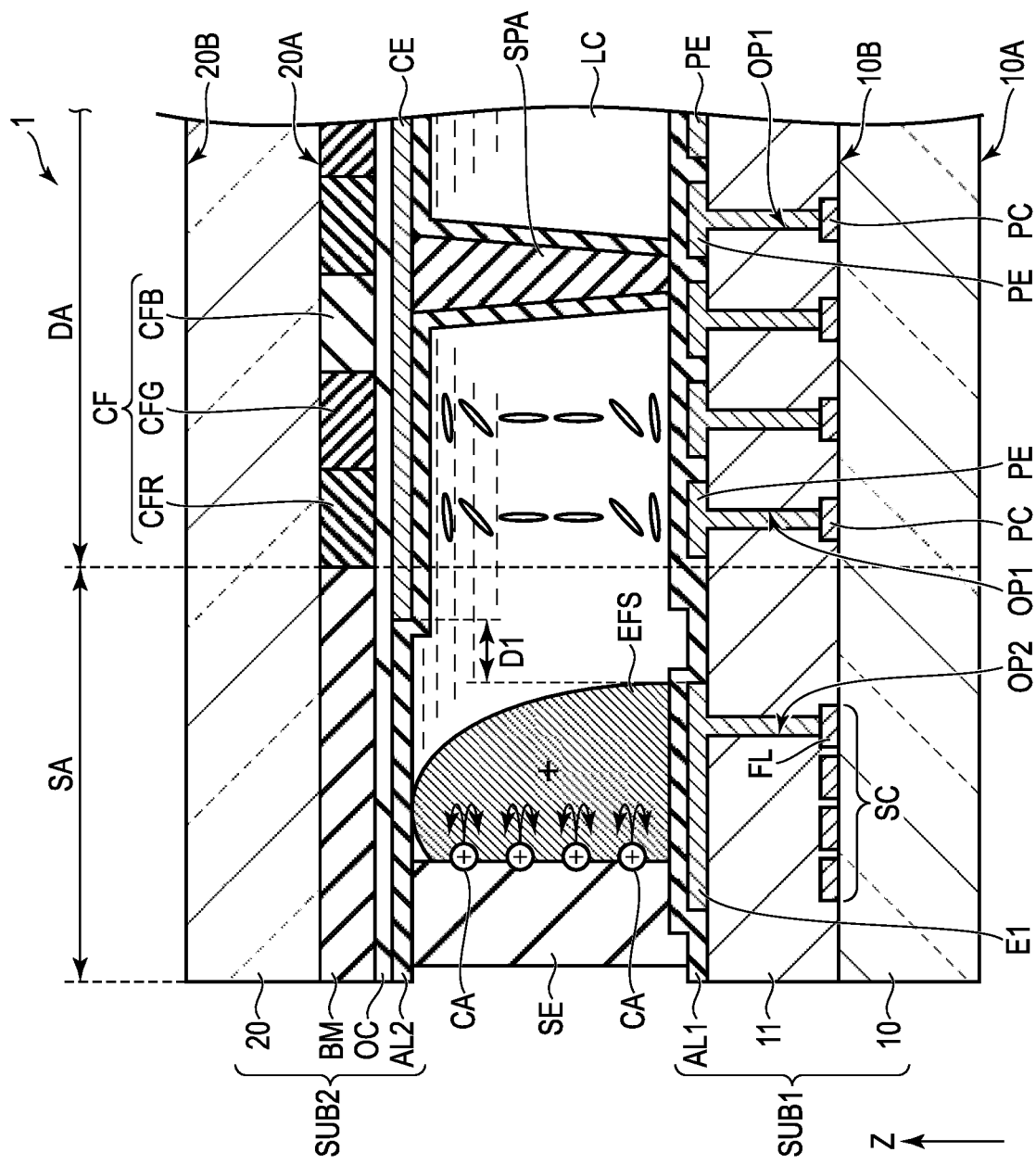
FIG. 5 is a diagram illustrating effects which can be exhibited by the display device of the embodiment.

By contrast, as shown in FIG. 5, in the display device 1 of this embodiment, the shield electrode E1 connected to the feeding line which applies a positive fixed potential, is located in the peripheral area SA, and therefore a positive electric field shield EFS can be formed around the shield electrode E1, as shown in FIG. 5. The positive electric field shield EFS keeps the cations CA leaked from the sealant SE over the sealant SE by the repulsive force (repulsion) of charge of the same type, and prevents the cations CA from traveling toward the display area DA. Thus, the occurrence of the above-described localized potential anomalies can be suppressed, and the display errors described above can be prevented. In other words, according to the configuration of the display device 1 of this embodiment, it is possible to maintain better-quality display than that by the configuration of the display device 1A of the first comparative example.

Note that in the display device 1 of this embodiment, the shield electrode E1 is not merely placed in the peripheral area SA, but overlaps the peripheral circuits SC in plan view. With this structure, the shielding electrode E1 protects the peripheral circuits SC from electro-static discharge (ESD). More specifically, the shield electrode E1, which is connected to the feeding line FL which applies a positive fixed potential, is placed in the peripheral area SA so as to overlap the peripheral circuits SC in plan view. Thus, the shield electrode E1 not only suppresses the migration of the cations CA but also protects the peripheral circuits SC from ESD.

From the viewpoint of protecting the peripheral circuits SC from ESD, the shield electrode E1 may be connected not to a wiring line that provides a positive fixed potential (the so-called VDD wiring line), but to a wiring line that provides a negative fixed potential or ground potential (the so-called VSS wiring line). In this case as well, as long as the shield electrode E1 connected to the wiring line that supplies a negative fixed potential or ground potential is located so as to overlap the peripheral circuits SC in plan view, the peripheral circuits SC can be protected from ESD. Thus, it is possible to protect the peripheral circuits SC from ESD, and thus to prevent degrading the display quality of the display device 1, which may be caused by ESD.

Further, this embodiment has such a configuration as shown in FIG. 2 that the peripheral circuits SC and the shield electrode E1 are disposed over to a position where they overlap a part of the sealant SE in plan view (that is, a configuration in which the outer edges of the peripheral circuits SC and the outer edge of the shield electrode E1 overlap the sealant SE). By contrast, as shown in FIG. 6, for example, when the peripheral circuits SC do not overlap the sealant SE in plan view (that is, when the outer edges of the peripheral circuits SC face an inner side of the sealant SE with a gap), the outer edge of the shield electrode E1 as well face the inner side the sealant SE with a gap in plan view. Even the configuration shown in FIG. 6 remains unchanged in the following points, that is, the shield electrode E1 connected to the feeding line FL, which provides a positive fixed potential, is located in the peripheral area SA, and that the shield electrode E1 is disposed in the peripheral area SA so as to overlap the peripheral circuits SC in plan view. Therefore, effects similar to those described above can be obtained.

Note that in the case where the shield electrode E1 does not overlap the sealant SE in plan view as in the configuration shown in FIG. 6, a predetermined space sp is provided between the shield electrode E1 and the sealant SE as encircled by dashed lines in FIG. 6. The space sp functions as a buffer (pocket) where the cations CA suppressed from migrating by the electric field shield EFS of the shield electrode E1, accumulate.

Next, further effects which can be achieved by the display device 1 of this embodiment will be described using the second comparative example. The second comparative example is intended to illustrate some of the effects which can be exhibited by the display device 1 of this embodiment, and the effects common to the second comparative example and this embodiment are not excluded from the scope of the present invention.

A display device 1B of the second comparative example is different from the display device 1 of the present embodiment illustrated in FIGS. 1 to 3 in the configuration that the shield electrode E1 and the common electrode CE overlap each other in a region R1 which is in the vicinity of the boundary between the display area DA and the peripheral area SA as shown in FIG. 7.

As shown in FIG. 7, in the display device 1B of this comparative example, the shield electrode E1 overlaps the common electrode CE in the region R1, or is very close to the pixel electrodes PE in the display area DA. In this case, due to the potential difference between the shield electrode E1 and the common electrode CE or the potential difference between the shield electrode E1 and the pixel electrodes, an electric field is generated between the electrodes (region R1), which may cause the positive electric field shield EFS formed by the shield electrode E1 to affect not only the peripheral area SA but also the display area DA. If the effect of the electric field shield EFS thus reaches the display area DA, some of the liquid crystal molecules in the liquid crystal layer LC (specifically, those liquid crystal molecules shaded in FIG. 7) are not twisted normally when the liquid crystal layer LC is driven. As a result, display errors may occur.

By contrast, in the display device 1 of this embodiment, the shield electrode E1 is disposed so as not to overlap the common electrode CE in plan view, and an interval of a distance D1 is given between the shield electrode E1 and the common electrode CE as shown in FIG. 5. In other words, the shield electrode E1 in this embodiment does not overlap the common electrode CE in the region R1 described above. With this configuration, the positive electric field shield EFS formed by the shield electrode E1 is suppressed from affecting the display area DA. Thus, display errors, which may be caused by the electric field shield EFS can be suppressed and better-quality display can be maintained as compared to that of the configuration of the display device 1B of the second comparative example.

Figure 8:
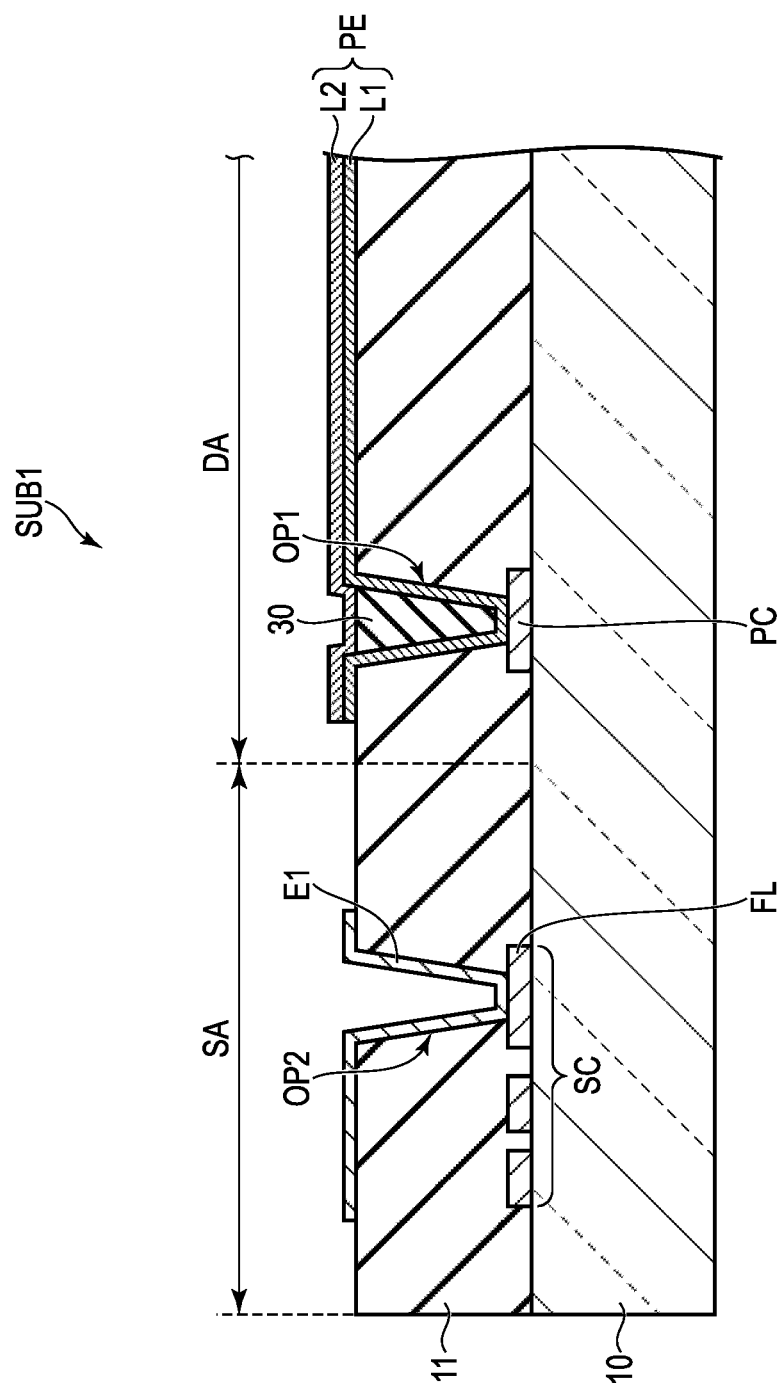
FIG. 8 is a cross-sectional view showing a configuration example of a first substrate which constitutes the display device of the embodiment.

In the embodiment described above, as shown in FIG. 8, the configuration in which the first substrate SUB1 includes one planarization film 11 is described. In this case, from the viewpoint of the manufacturing process, it is preferable that the shield electrode E1 be disposed in the same layer as the pixel electrodes PE provided on the display area DA side as shown in FIG. 8. More specifically, the pixel electrodes PE shown in FIG. 8 is formed by stacking a metal layer L2, which is a reflective electrode film, onto an ITO layer L1, which is a transparent conductive film, and the shield electrode E1 is formed in the same layer as the ITO layer L1, that is, at the same time as the ITO layer L1 in the process of forming the ITO layer L1 that forms the pixel electrode PE. Note that as shown in FIG. 8, in the position overlapping the opening OP1, a filler 30 is disposed on the ITO layer L1 which forms the pixel electrode PE. The filler 30 is provided to planarize the metal layer L2 that forms the pixel electrode PE. The metal layer L2 is silver (Ag), for example, and is placed to make the pixel electrode PE function as a reflective electrode.

Note that the configuration of the first substrate SUB1 is not limited to that shown in FIG. 8, but it may as well be configured to include two planarization films 11 and 12 as shown in FIG. 9, for example. In the case of the configuration of FIG. 9, on the display area DA side, a relay electrode RE is located between the pixel circuit PC and the pixel electrode PE to relay therebetween, on the planarization film 11. The relay electrode RE is in contact with the pixel circuit PC through the opening OP3 formed in the planarization film 11. The relay electrode RE is covered by the planarization film 12. On the planarization film 12, an ITO layer L1, which forms the pixel electrode PE, is disposed so as to be in contact with the relay electrode RE via an opening OP4 formed in the planarization film 12. At a position overlapping the opening OP4, a filler 30 is disposed on the ITO layer L2 which forms the pixel electrode PE. On the ITO layer L1 which forms the pixel electrode PE and the filler 30, a metal layer L2, which forms the pixel electrode PE is disposed.

In the display area DA, when the first substrate SUB1 has the configuration described above, the shield electrode E1 provided in the peripheral area E1, may be placed not in the same layer as the ITO layer L1, which forms the pixel electrode PE, as shown in FIG. 9, but placed on the same layer as the relay electrode RE. That is, the shield electrode E1 may be formed simultaneously in the process of forming the relay electrode RE. In this case, the shield electrode E1 is brought into contact with the feeding line FL via an opening OP5 formed in the planarization film 11. As described above, in the configuration of FIG. 9, the first substrate SUB1 includes two planarization films 11 and 12, and the shield electrode E1 is placed in the same layer as that of the relay electrode RE on the display area DA side. Even in such a configuration, the following points remain unchanged, that is, the shield electrode E1 connected to the feeding line FL, which provides a positive fixed potential is disposed in the peripheral area SA, and the shield electrode E1 is placed in the peripheral area SA so as to overlap the peripheral circuit SC in plan view. Therefore, advantageous effects similar to those described above can be obtained as well.

According to one embodiment described above, the display device 1 comprises a shield electrode E1 disposed so as to overlap the peripheral circuit SC, and connected to the feeding line FL that provides a positive fixed potential. According to this, it is possible to achieve display of a better quality compared to that of the conventional display devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate;
a second substrate opposing the first substrate;
a liquid crystal layer disposed between the first substrate and the second substrate; and
a sealant which adheres the first substrate and the second substrate to each other and seals the liquid crystal layer,
the first substrate comprising:
a pixel electrode disposed in a display area;
a peripheral circuit disposed in a peripheral area surrounding the display area; and
a shield electrode disposed in a position overlapping the peripheral circuit in plan view,
the second substrate comprising:
a common electrode disposed in the display area and opposing the pixel electrode, wherein
the shield electrode and the common electrode do not overlap each other in plan view,
the common electrode includes a lead-out line which is drawn from the display area towards the peripheral area, and
the shield electrode does not overlap the lead-out line in plan view.

2. The display device of claim 1, wherein
the shield electrode is connected to a wiring line included in the peripheral circuit and applying a predetermined fixed potential.

3. The display device of claim 2, wherein
the wiring line applies a fixed potential of a same type as that of charge of ions leaking from the sealant to the shield electrode.

4. The display device of claim 2, wherein
the wiring line applies a positive fixed potential to the shield electrode.

5. The display device of claim 2, wherein
the wiring line applies a negative fixed potential or ground potential to the shield electrode.

6. The display device of claim 1, wherein
the first substrate further comprises:
a pixel circuit electrically connected to the pixel electrode; and
a first planarization film which covers the pixel circuit, and
the pixel electrode is disposed on the first planarization film and is in contact with the pixel circuit via an opening formed in the first planarization film.

7. The display device of claim 6, wherein
the shield electrode is disposed in the same layer as that of the pixel electrode.

8. The display device of claim 1, wherein
the first substrate further comprises:
a pixel circuit electrically connected to the pixel electrode;
a first planarization film which covers the pixel circuit;
a relay electrode disposed on the first planarization film; and
a second planarization film which covers the relay electrode, and
the pixel electrode is disposed on the second planarization film and electrically connected to the pixel circuit by being brought into contact with the relay electrode via an opening formed in the second planarization film.

9. The display device of claim 8, wherein
the shield electrode is disposed in a same layer as that of the relay electrode.

10. A display device comprising:
a first substrate;
a second substrate opposing the first substrate;
a liquid crystal layer disposed between the first substrate and the second substrate; and
a sealant which adheres the first substrate and the second substrate to each other and seals the liquid crystal layer,
the first substrate comprising:
a pixel electrode disposed in a display area;
a peripheral circuit disposed in a peripheral area surrounding the display area; and
a shield electrode disposed in a position overlapping the peripheral circuit in plan view,
the second substrate comprising:
a common electrode disposed in the display area and opposing the pixel electrode, wherein
the shield electrode is provided to surround the common electrode in plan view, and an inner edge of the shield electrode extends along an outer edge of the common electrode,
the common electrode includes a lead-out line which is drawn from the display area towards the peripheral area, and
the shield electrode opposes the lead-out line with a predetermined interval therebetween in plan view.

11. The display device of claim 10, wherein
the shield electrode is connected to a wiring line included in the peripheral circuit and applying a predetermined fixed potential.

12. The display device of claim 11, wherein
the wiring line applies a positive fixed potential to the shield electrode.

13. The display device of claim 10, wherein
the first substrate further comprises:
a pixel circuit electrically connected to the pixel electrode; and
a first planarization film which covers the pixel circuit,
the pixel electrode is disposed on the first planarization film and is in contact with the pixel circuit via an opening formed in the first planarization film, and
the shield electrode is disposed in a same layer as that of the pixel electrode.

14. The display device of claim 10, wherein
the first substrate further comprises:
a pixel circuit electrically connected to the pixel electrode;
a first planarization film which covers the pixel circuit;
a relay electrode disposed on the first planarization film; and
a second planarization film which covers the relay electrode,
the pixel electrode is disposed on the second planarization film and is electrically connected to the pixel circuit by being brought into contact with the relay electrode through an opening formed in the second planarization film, and
the shield electrode is disposed in a same layer as that of the relay electrode.

15. A display device comprising:
a first substrate;
a second substrate opposing the first substrate;
a liquid crystal layer disposed between the first substrate and the second substrate; and
a sealant which adheres the first substrate and the second substrate to each other and seals the liquid crystal layer,
the first substrate comprising:
a pixel electrode disposed in a display area;
a peripheral circuit disposed in a peripheral area surrounding the display area; and
a shield electrode disposed in a position overlapping the peripheral circuit in plan view,
the second substrate comprising:
a common electrode disposed in the display area and opposing the pixel electrode, wherein
the shield electrode is provided to surround the common electrode in plan view, and an inner edge of the shield electrode extends along an outer edge of the common electrode,
an outer edge of the common electrode is formed into a staircase-like shape, and
an inner edge of the shield electrode as well is formed into a staircase-like shape to match the outer edge of the common electrode.

16. The display device of claim 11, wherein
another wiring line of the peripheral circuit is provided between the wiring line and an end edge of the first substrate.

17. A display device comprising:
a first substrate;
a second substrate opposing the first substrate;
a liquid crystal layer disposed between the first substrate and the second substrate; and
a sealant which adheres the first substrate and the second substrate to each other and seals the liquid crystal layer,
the first substrate comprising:
a pixel electrode disposed in a display area;
a peripheral circuit disposed in a peripheral area surrounding the display area; and
a shield electrode disposed in a position overlapping the peripheral circuit in plan view,
the second substrate comprising:
a common electrode disposed in the display area and opposing the pixel electrode, wherein
the shield electrode is provided to surround the common electrode in plan view, and an inner edge of the shield electrode extends along an outer edge of the common electrode, and
the inner edge of the shield electrode is spaced apart from the outer edge of the common electrode by a predetermined distance, and a part of a wiring line included in the peripheral circuit overlaps the shield electrode, and another part thereof passes through between the common electrode and the shield electrode.

18. The display device of claim 17, wherein
the shield electrode is connected to the wiring line at a plurality of locations overlapping the wiring line.

19. The display device of claim 10, wherein
the sealant is located between an outer edge portion of the first substrate and an outer edge portion of the second substrate, and the outer edge of the shield electrode overlaps the sealant.

20. The display device of claim 19, wherein
an outer edge of the peripheral circuit overlaps the sealant.

21. The display device of claim 10, wherein
the sealant is located between an outer edge portion of the first substrate and an outer edge portion of the second substrate, and
an outer edge of the shield electrode faces an inner side of the sealant with a gap.

22. The display device of claim 21, wherein
the outer edge of the peripheral circuitry faces an inner side of the sealant with a gap.

* * * * *